April 1, 1952     Z. A. HUGHES     2,591,072
BARBECUE PIT

Filed April 28, 1947     3 Sheets-Sheet 1

Inventor
Zack A. Hughes

By E. J. Hardway
Attorney

April 1, 1952     Z. A. HUGHES     2,591,072
BARBECUE PIT

Filed April 28, 1947     3 Sheets-Sheet 2

Inventor
Zach A. Hughes
By E. V. Hardway
Attorney

April 1, 1952  Z. A. HUGHES  2,591,072
BARBECUE PIT

Filed April 28, 1947  3 Sheets-Sheet 3

Inventor
Zach A. Hughes
By E. J. Hardway
Attorney

Patented Apr. 1, 1952

2,591,072

UNITED STATES PATENT OFFICE 2,591,072

BARBECUE PIT

Zach A. Hughes, New Caney, Tex.

Application April 28, 1947, Serial No. 744,404

3 Claims. (Cl. 99—260)

This invention relates to a barbecue pit.

An object of the invention is to provide cooking equipment of the character described whereby the meats being cooked will be exposed to the heat and smoke from the furnace uniformly on all sides and will be intermittently exposed to the flame for short periods of time in succession.

It is another object of the invention to provide equipment of the character described whereby the meats being cooked may be completely surrounded by the hot air and smoke from the furnace so that they will be cooked uniformly on all sides.

It is another object of the invention to provide cooking equipment of the character described wherein the receptacles for holding the meat are rotated so as to conduce to uniformity in the application of the heat and smoke to the articles being cooked.

The invention also includes means for automatically regulating the heat and smoke applied to the articles being cooked.

It is still another object of the present invention to provide means for automatically applying the flavoring sauce to meats during the cooking process.

Other objects and advantages will be apparent from the following specification which is illustrated by the accompanying drawings, wherein:

Figure 5 is a fragmentary, vertical, sectional view of the sauce dispenser.

Figure 1:
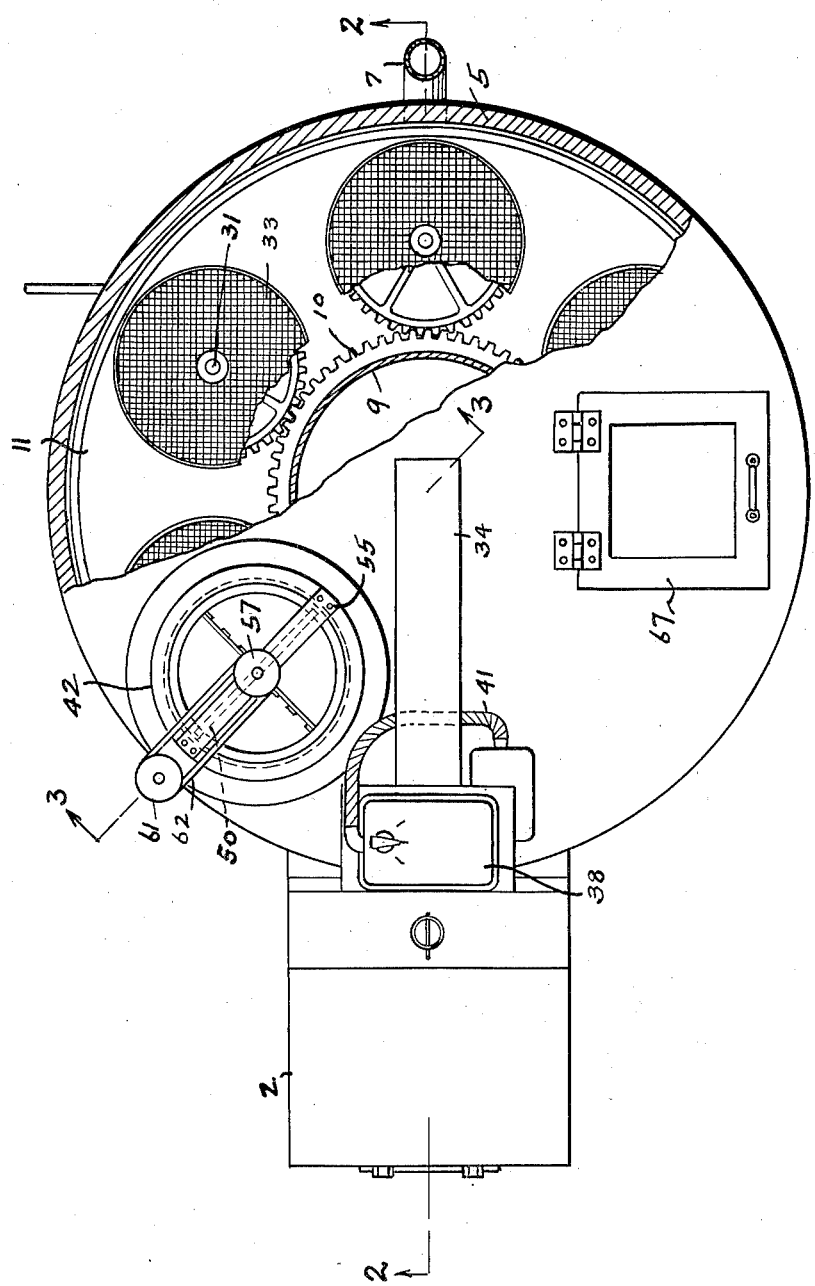
Figure 1 is a plan view of the equipment partly broken away.

Referring now more particularly to the drawings wherein like numerals of reference designate the same parts in each of the figures, the numeral 1 designates a housing preferably cylindrical in form and composed in any selected material suitable for the purpose.

Adjacent one side of the housing there is a furnace 2 having an upwardly extended pipe leading therefrom for the outlet of the products of combustion and which is controlled by a suitable damper 4.

Mounted on the housing there is an oven 5 which is completely enclosed and which is provided with a cover 6. This oven is also preferably cylindrical in shape to conform to the shape of the housing and it is provided with a fume outlet 7 controlled by a suitable damper 8.

Within the oven and centrally located with respect thereto and depending from the cover 6 there is a tubular anchor 9 whose lower end is outwardly turned and formed into an annular gear 10.

Located at the bottom of the oven there is a rotatable pan-shaped disc 11 whose upper margin 12 is inwardly turned and declines.

Figure 2:
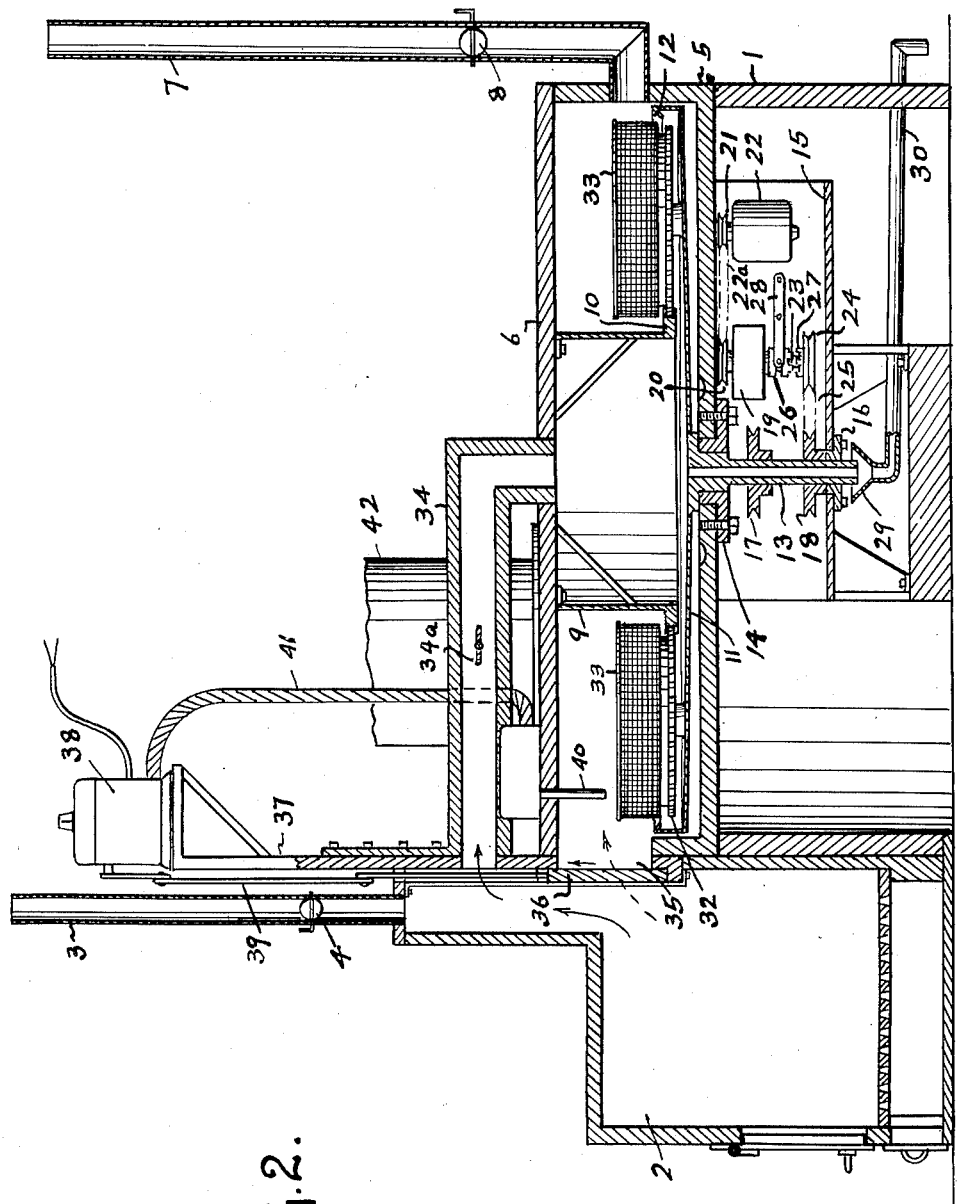
Figure 2 is a vertical, sectional view taken on the line 2—2 of Figure 1.

This disc has a central, depending, tubular stem 13 whose upper end is externally enlarged and works through a gland 14 which is fastened to the bottom of the oven, as shown in Figure 2.

Depending from the bottom of the oven 5 there is a channel shaped guard 15 which is provided with a gland 16, fastened thereto, through which the stem 13 also extends.

Secured to the stem 13 there are the upper and lower sheaves 17 and 18.

Within the housing 15 there is a conventional type of transmission 19 which is driven by means of a sheave 20 suitably mounted on the bottom of the oven 5. Aligned with the sheave 20 there is also a sheave 21 which is fixed on the shaft of an electric motor 22 also mounted in the guard 15 and operating over these sheaves and transmitting rotation from the latter to the former there is a belt 22a.

The transmission 19 contains conventional reduction gearing which has not been thought necessary to show in detail. This transmission drives a shaft 23, loosely mounted on which there is a sheave 24 which is aligned with the sheave 18 and operating over these last mentioned sheaves and transmitting rotation from the former to the latter there is a belt 25.

Mounted on the shaft 23 there is a clutch 26 and the facing side of the sheave 24 is provided with the clutch jaw 27. The clutch may be shifted into and out of engagement with the jaw of the sheave 24 by a conventional hand operated lever 28 in the usual way. When clutched the sheave 24 will drive the sheave 18 through the belt 25 which in turn will drive the spindle 13 and rotate the disc 11.

It will be noted from an inspection of Figure 2 that the bottom of the pan-shaped disc 11 slopes downwardly and inwardly to its center so that liquid collecting therein will drain out through the spindle 13 and beneath said spindle there is a receiving hopper 29 having a conveyor pipe 30 which discharges outside of the housing.

Upstanding from the disc 11 and spaced apart around it are the spindles 31 and mounted to rotate on these spindles are the container supporting gears 32 which are in mesh with the annular gear 10, so that as the disc 11 rotates about the spindle 13 as an axis the gears 32 will rotate about the respective spindles 31 as axes.

Mounted on the respective supporting gears 32 are the containers 33 of any selected construction, preferably pan-shaped and preferably formed of foraminated material.

Figure 3:
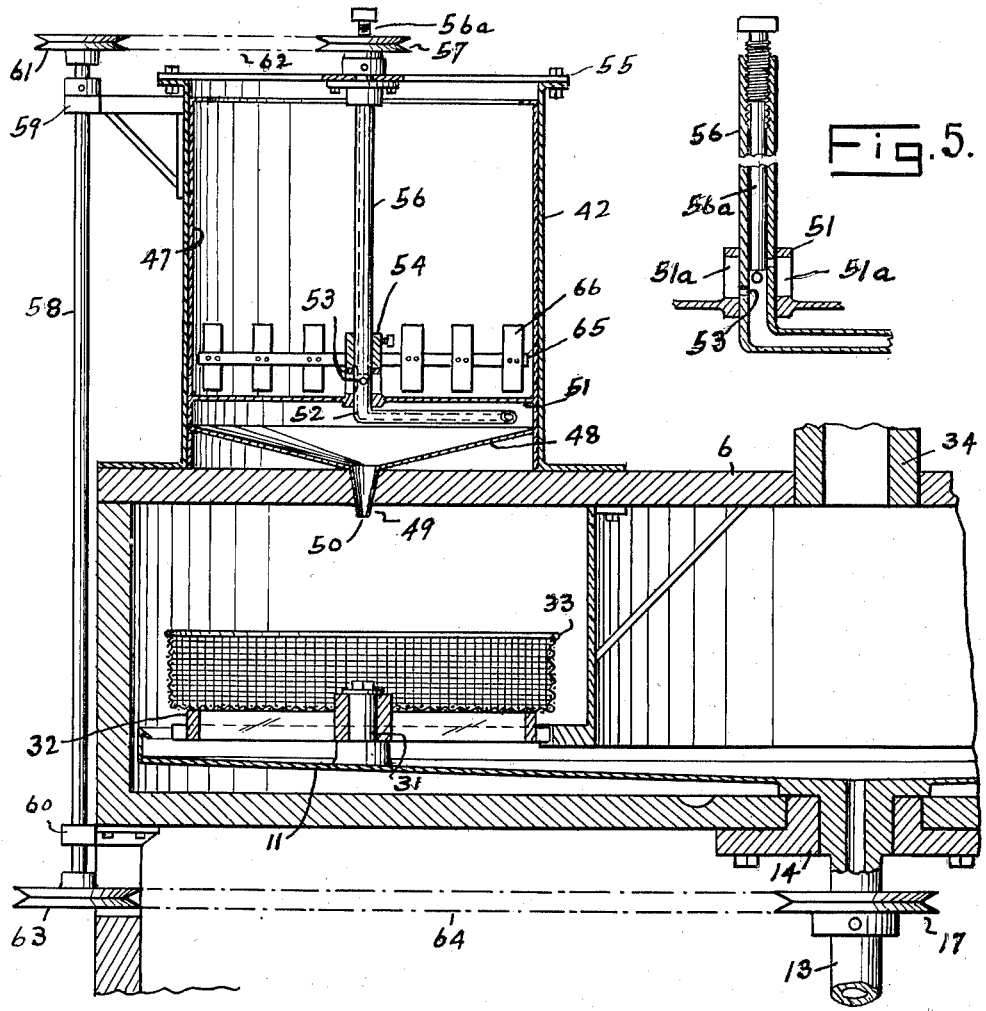
Figure 3 is a fragmentary, vertical, sectional view taken on the line 3—3 of Figure 1.
Figure 4:
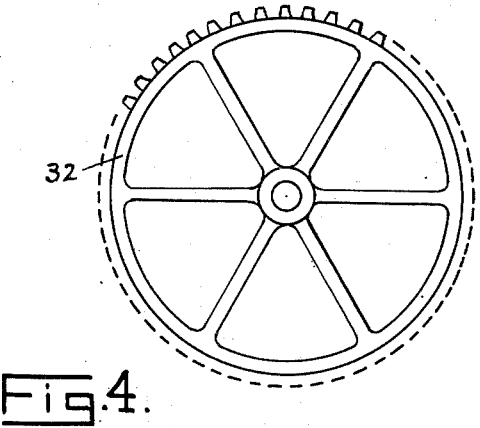
Figure 4 is a plan view of one of the container supporting gears.

It will be noted from an inspection of Figure 3 that the upper ends of the spindles 31 are reduced thus forming external annular upwardly facing shoulders on which the hubs of the respective container supporting gears 32 rest so that the containers 33 will be spaced above the disc 11 to allow the free circulation of air about said containers and the containers being foraminated, or formed of open work, the hot air and smoke will readily come into contact with the meat to be cooked.

Leading inwardly radially from the upper portion of the furnace 2 there is a duct 34 which is controlled by the damper 34a and whose inner end is downwardly turned through the cover 6 of the oven and enters the space enclosed by the tubular anchor 9; also it will be noted from an inspection of Figure 2 that the space in the oven around the anchor 9 may be connected with the furnace 2 by means of an inlet opening 35 which may be closed by the vertically slidable shutter 36.

Mounted on a suitable bracket, as 37, upstanding from the oven, there is an electric damper control mechanism 38 which is connected to the shutter 36 through the linkage 39. This switch mechanism is connected with a thermo-couple 40, which depends into the oven 5, by means of the conductor 41.

At the beginning of the cooking process the shutter 36 is in its upper position closing the duct 34 and clearing the opening 35 so that the heat, smoke and flame from the furnace will directly enter the space around the tubular anchor 9, in which the meat to be cooked is located. The thermo-couple 40 is preferably directly in front of the opening 35. The cooking process will therefore begin by the heat and smoke entering the compartment in which the meat is located directly. As the cooking process proceeds the heat of the oven will increase and when a selected degree of temperature has been exceeded the thermo-couple 40 will operate to throw the electric damper control mechanism 38 and this will release the shutter 36, and it will fall by gravity into the position shown in Figure 2 to close the opening 35. The heat will then reach the articles being cooked indirectly through the duct 34 into the interior of the tubular anchor 9 and thence around the lower end of said anchor beneath the containers 33 and will circulate about the oven outside of said anchor and around the articles being cooked in the containers 33.

During the cooking process it may be desirable to apply a sauce or basting material to the meats being cooked. For that purpose a housing 42 preferably circular in form has been mounted on the cover 6 and whose lower end is formed into a hopper 48 and fitted into this housing there is a removable container 47. The hopper 48 terminates in a downwardly directed nozzle 49 which extends through the cover 6 and which is elongated radially and is formed with a narrow discharge opening 50 of a length substantially equal to the diameter of a container 33. As the disc 11 rotates the containers are brought successively underneath the nozzle 49, and as the containers also rotate the sauce will be thoroughly distributed over the meat.

The bottom of the container 47 is provided with a central upstanding bearing 51 and rotatably mounted in this bearing there is a tubular shaft 56 whose lower end is formed into a nozzle pipe 52 which is laterally turned so that it will extend radially relative to the hopper 48. This shaft 56 has the inlet openings 53 above the bottom of the container through which the sauce in the container may enter said shaft 56 and nozzle pipe 52.

Across the top of the housing 42 there is a transverse bar 55 having a central bearing in which the vertical shaft 56 rotates.

The bearing 51 has the vertically elongated slots 51a and the openings 53 are spaced apart around the shaft 56 and may also be spaced apart longitudinally relative to said shaft, as shown in Figure 5, so that as said shaft rotates the openings 53 will intermittently register with the slots 51a so that the sauce will merely drip from the nozzle pipe 52 into the hopper 48.

There is a controlling rod 56a fitted downwardly through the shaft 56 and having a threaded connection with the upper end of said shaft, said controlling rod forming in effect a valve to control the openings 53 by suitably adjusting said rod so that all or any of the openings 53 may be opened or closed and the flow of the sauce thus controlled.

Fixed on the upper end of the shaft 56 there is a sheave 57 and mounted in the bearings 59 and 60 there is a vertical shaft 58. The bearing 59 is carried by the housing 42 and the bearing 60 is carried by the housing 1.

Fixed on the upper end of the shaft 58 there is a sheave 61 aligned with the sheave 57 and operating over these sheaves and transmitting rotation from the former to the latter there is a belt 62.

Fixed on the lower end of the shaft 58 there is a sheave 63 which is aligned with the sheave 17 fixed on the spindle 13 and operating these sheaves and transmitting rotation from the latter to the former there is a belt 64.

Fastened on the shaft 56 and supported on the bearing 51 there is a bearing 54 and extending each way therefrom there is a mixer bar 65 having vertical paddles 66 fixed thereto and preferably extending above and beneath the bar 65.

The container 47 will be supplied with a suitable liquid sauce, or basting material and during the operation of the equipment the shaft 56 will be driven from the spindle 13 through the sheaves and belts above described and will rotate the mixer to maintain the sauce or basting material thoroughly mixed and this material will pass through the openings 53 and through the nozzle pipe 52 and will be delivered in the quantity required to the outer margin of the hopper 48 and will gradually drain down to, and drip through, the elongated nozzle opening 50 onto the meat in the containers 33.

Condensate or excess liquids collecting in the pan-shaped disc 11 will drain out through the tubular spindle 13 into the hopper 29 and will be delivered out through the conveyor pipe 30.

For access to the interior of the oven 5 the cover 6 is provided with a suitable opening which is normally maintained closed by means of the hinged shutter 67.

The drawings and description are illustrative merely while the broad principle of the invention will be defined by the appended claims.

What I claim is:

1. Equipment of the character described comprising, an oven, means in the oven separating it into a central inner chamber and an outer chamber about the inner chamber, a rotatable support in the oven, meat containers spaced apart on the support in the outer chamber, means for rotating said support to revolve said containers, means for rotating the containers as they revolve, a furnace adjacent the oven, said furnace having an entrant opening into the outer chamber and a duct leading from the furnace into the inner chamber and automatic means for alternatively opening and closing said entrant opening and duct.

2. Equipment of the character described comprising, an oven, means in the oven separating it into a central inner chamber and an outer chamber about the inner chamber, a rotatable support in the oven, a tubular spindle depending from the support and having a bearing in the oven and forming a drain for the support, means for rotating the spindle and support, a series of containers mounted on the support to revolve about in the outer chamber as the support rotates, means for rotating the containers as they revolve, a heating furnace adjacent the oven and means providing for the circulation of hot air and smoke from the furnace through the oven about said containers.

3. Equipment of the character described comprising, an oven, a cylindrical baffle in the oven separating it into a central inner chamber and an outer chamber about the inner chamber, a rotatable support in the oven, a tubular spindle depending from the support and having a bearing in the oven and forming a drain for the support, means for rotating the spindle and support, a series of containers mounted on the support in the outer chamber, to revolve about the baffle as the support rotates, interengaging means on the containers and baffle cooperable to rotate the containers as they revolve, a heating furnace adjacent the oven and having an outlet opening leading into said outer chamber, and duct means in communication with said furnace and said inner chamber.

ZACH A. HUGHES.

REFERENCES CITED

The following references are of record in the file of this patent:

UNITED STATES PATENTS

| Number | Name | Date |
|---|---|---|
| 835 | Pierce | July 12, 1838 |
| 420,891 | Russell | Feb. 4, 1890 |
| 814,540 | Higbee | Mar. 6, 1906 |
| 1,163,807 | Bower | Dec. 14, 1915 |
| 1,312,833 | Colias | Aug. 12, 1919 |
| 1,460,486 | Harvey | July 3, 1923 |
| 1,497,826 | Zaloom | June 17, 1924 |
| 1,602,650 | Cook et al. | Oct. 12, 1926 |
| 1,733,627 | Rasmussen et al. | Oct. 29, 1929 |
| 1,785,079 | Grapp | Dec. 16, 1930 |
| 1,822,355 | Mayhen | Sept. 8, 1931 |
| 1,870,476 | Babcock | Aug. 9, 1932 |
| 1,964,372 | Tygart | June 26, 1934 |
| 1,971,012 | McDonald | Aug. 21, 1934 |
| 2,060,992 | Jackson | Nov. 17, 1936 |
| 2,205,914 | Stafford | June 25, 1940 |
| 2,314,627 | Millikan et al. | Mar. 23, 1943 |